United States Patent
Ferrar et al.

(10) Patent No.: US 8,851,121 B2
(45) Date of Patent: Oct. 7, 2014

(54) TORQUE MULTIPLIER FOR VALVE TURNING MACHINE

(75) Inventors: Scott Ferrar, Hoffman Estates, IL (US); Jeffrey Swiatowy, Crystal Lake, IL (US); Greg Drzewiecki, Woodstock, IL (US)

(73) Assignee: Illlinois Tool Works Inc., Glenview, IL (US)

( * ) Notice: Subject to any disclaimer, the term of this patent is extended or adjusted under 35 U.S.C. 154(b) by 247 days.

(21) Appl. No.: 13/291,268

(22) Filed: Nov. 8, 2011

(65) Prior Publication Data

US 2012/0138830 A1   Jun. 7, 2012

Related U.S. Application Data

(60) Provisional application No. 61/420,025, filed on Dec. 6, 2010.

(51) Int. Cl.
*A01G 25/09* (2006.01)
*F16K 31/12* (2006.01)
*F16K 31/46* (2006.01)

(52) U.S. Cl.
CPC ............... *F16K 31/46* (2013.01); *F16K 31/12* (2013.01)
USPC ................ 137/899; 251/129.11; 251/250.5; 251/292; 248/284.1

(58) Field of Classification Search
CPC ................................. F16K 31/46; F16K 31/12
USPC ................ 251/129.11, 248, 250.5, 291, 292; 137/899; 248/276.1, 284.1
See application file for complete search history.

(56) References Cited

U.S. PATENT DOCUMENTS

| | | | |
|---|---|---|---|
| 1,536,081 A * | 5/1925 | Dean ............................ | 180/53.7 |
| 1,979,340 A * | 11/1934 | Norman ................... | 73/862.193 |
| 3,481,229 A | 12/1969 | Dickman et al. | |
| 3,847,039 A | 11/1974 | Azuma | |
| 4,828,033 A | 5/1989 | Frison | |
| 5,018,929 A | 5/1991 | Carson | |
| 5,570,581 A | 11/1996 | Preston | |
| 5,570,975 A | 11/1996 | Reinert, Sr. | |
| 5,662,176 A | 9/1997 | Madgwick | |
| 5,810,051 A | 9/1998 | Campagna | |
| 6,009,905 A | 1/2000 | Arnemann | |
| 6,125,868 A * | 10/2000 | Murphy et al. ................... | 137/1 |
| 6,471,165 B2 | 10/2002 | Twisselmann | |

(Continued)

OTHER PUBLICATIONS

Vermeer Manufacturing Company; FM350 FlowMASTER Series (product literature); 1210 Vermeer Road East; P.O. Box 200; Pella, IA; 50219; publicly available at least as early as Dec. 5, 2010.

(Continued)

*Primary Examiner* — John K Fristoe, Jr.
*Assistant Examiner* — Ian Paquette
(74) *Attorney, Agent, or Firm* — Klintworth & Rozenblat IP LLC

(57) ABSTRACT

A vehicle with devices thereon for exercising the valves of a municipal water system includes a first arm with a valve turning machine at its outer end. A second arm is also attached to the vehicle, the second arm having a torque multiplier head having an input end and an output. A connector connects the valve turning machine to the input and the output of the torque multiplier applies increased torque to the stem of a valve.

16 Claims, 7 Drawing Sheets

(56) References Cited

U.S. PATENT DOCUMENTS

| | | |
|---|---|---|
| 7,004,262 B1 | 2/2006 | Voichoskie |
| 7,311,452 B2 | 12/2007 | Chapman |
| 7,334,606 B1 | 2/2008 | Hurley |
| 8,025,078 B2 | 9/2011 | Ferrar |
| 2004/0134674 A1 | 7/2004 | Skorez |
| 2005/0193451 A1 | 9/2005 | Quistgaard |
| 2006/0011881 A1* | 1/2006 | Leighton .................. 251/291 |
| 2008/0196790 A1 | 8/2008 | Fargeot |

OTHER PUBLICATIONS

Advancedmanipulator.com; www.advancedmanipulator.com/images/torque_arm/horton.jpg; www.advancedmanipulator.com/images/torque_arm/gehl.jpg; www.advancedmanipulator.com/images/torque_arm/horton.jpg; publicly available at least as early as Apr. 11, 2008.

* cited by examiner

TORQUE MULTIPLIER FOR VALVE TURNING MACHINE

The applicants claim priority from their provisional application filed Dec. 8, 2010 and assigned Ser. No. 61/420,025.

BACKGROUND OF THE INVENTION

Hydraulically operated valve turning machines are mounted at the outer end of an arm, the inner end of which is attached to a vehicle such as a truck or a trailer. The amount of torque that can be applied by the valve turning machine is limited by the structural strength of the arm. That is, the torque output of the valve turning machine cannot exceed the structured capabilities of the arm that supports the machine. A municipality must therefore purchase at least one very large valve turning machine to exercise valves requiring the greatest amount of torque of its water system.

One option is to place two separate valve turning devices on a single vehicle with one device suitable for exercising smaller valves and a second device for exercising larger valves. Providing two machines on the vehicle, however, requires two separate motors and controlling devices, one for each of the valve turning machines. A device with duplicate systems is expensive to manufacture and incurs greater maintenance fees.

It would be desirable to provide an adapter useable with existing valve turning machines which would enhance the torque output of a valve turning machine without damaging the articulating arm to which the machine is attached.

SUMMARY OF THE INVENTION

Briefly, the present invention is useable with a valve turning machine attached to the outer end of a vehicle mounted articulating arm. Such articulating arms are designed to be relatively light in weight and therefore the output torque of the machine attached thereto is limited by the strength of the arm.

The present invention is a secondary arm attached to the vehicle with a torque multiplier head attached thereto. The secondary arm is more rigidly constructed than the articulating arm and is shorter in length and therefore can sustain a greater torque applied thereto. At the outer end of the secondary arm is a torque multiplier head. A vertically oriented input shaft receivable in the retaining bore of the valve turning attached to the articulating arm is attachable to the torque multiplier head to transfer power thereto. The multiplier head includes a pinion gear at the lower end of the input shaft which in turn drives a bull gear surrounding an output drive knuckle having a transverse non-circular bore for receiving a valve key. The torque applied by the valve turning machine to the input shaft is increased by the ratio of the diameters of the bull gear to the pinion gear. By providing a torque multiplier on the second arm, the vehicle requires only one motor and its associated controlling hydraulics and electronics rather than separate motors and controls.

BRIEF DESCRIPTION OF THE DRAWINGS

A better understanding of the present invention will be had after a reading of the following description taken in conjunction with the drawings wherein.

DETAILED DESCRIPTION OF PREFERRED EMBODIMENT

Figure 1:
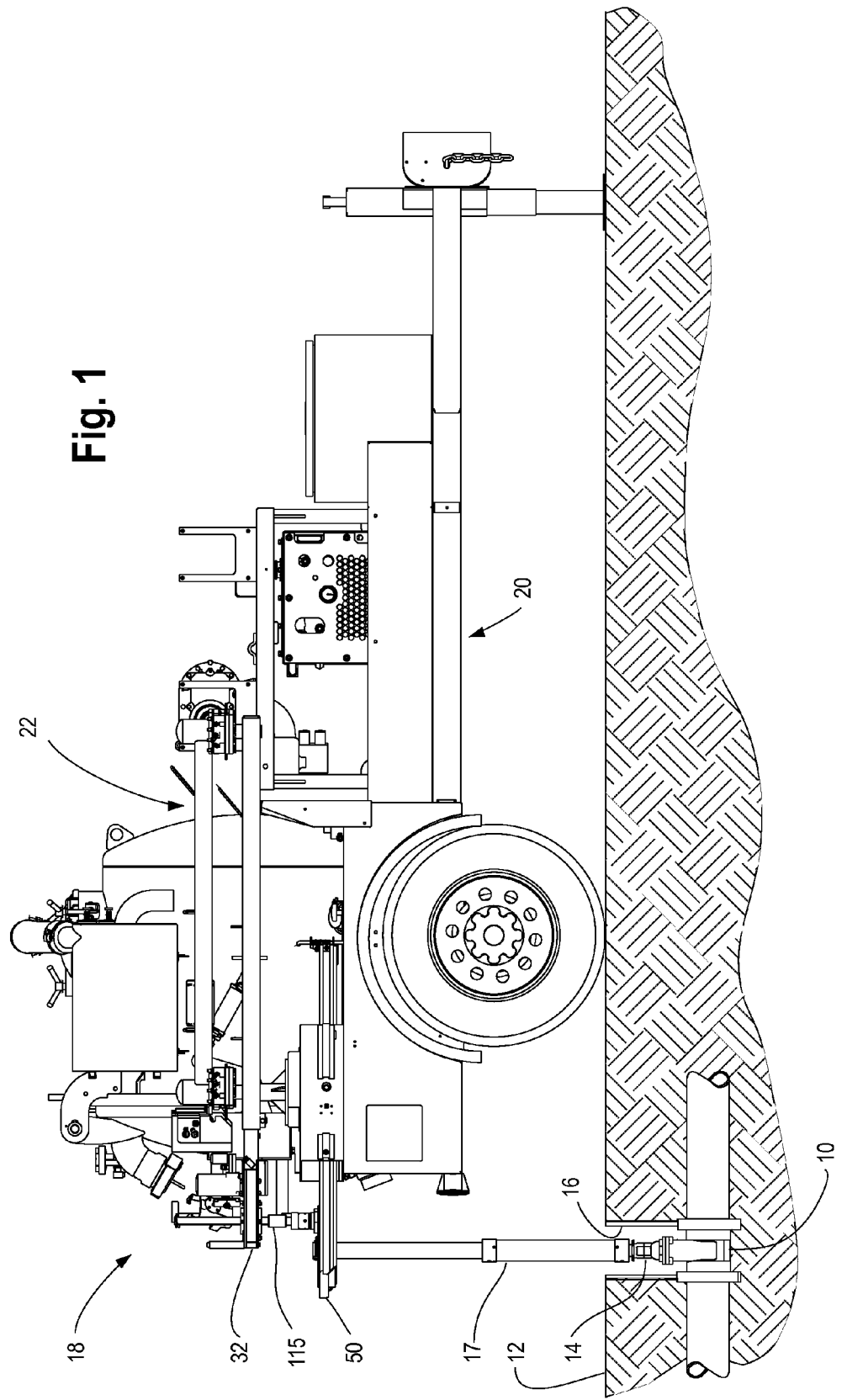
FIG. 1 is a side elevational view of a trailer with a valve operating device mounted thereon in accordance with the present invention.

Referring to FIG. 1, a valve 10 positioned below ground level 12 has a stem 14 that is rotated to open and close the valve 10. A tubular shaft 16 extends from the valve stem 14 to ground level 12. To open or close the valve 10, and elongate key 17 is extended through the shaft 16 and the lower end of the key 17 has a connector that attaches to the stem 14 of the valve 10. Rotation of the key 17 and valve stem 14 in one direction opens the valve 10 and rotation of the valve stem 14 in the opposite direction closes the valve 10.

Figure 2:
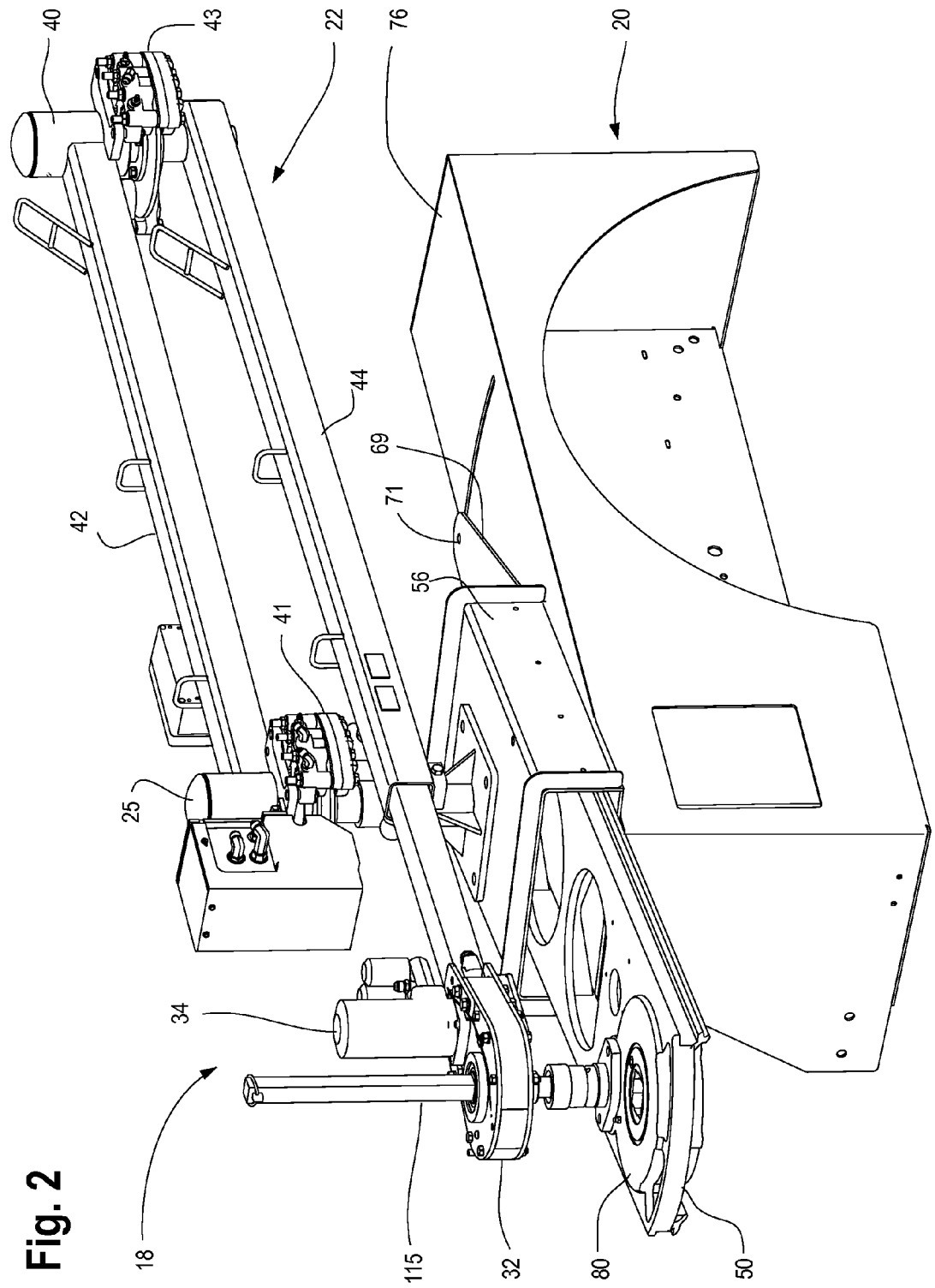
FIG. 2 is an enlarged isometric view of a portion of the trailer showing the elements of the invention including a first arm with a valve operating machine at the distal end thereof and a second arm with a torque multiplier head having gearing therein and the valve operating machine of the first arm having a key connected to the input of the torque multiplier head, wherein gearing in the second arm will increase the torque output.
Figure 3:
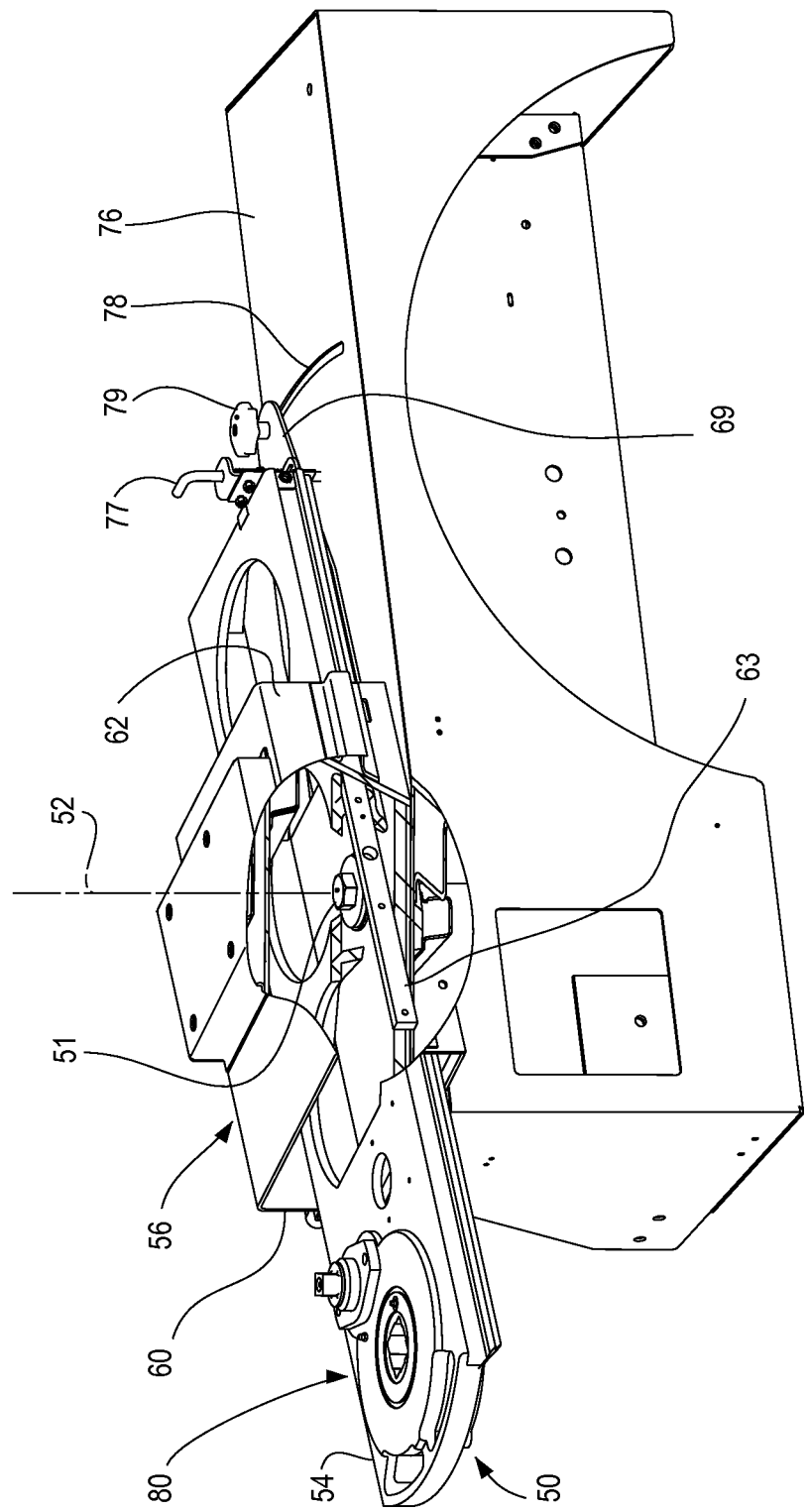
FIG. 3 is a second enlarged isometric view showing only the second arm with portions of the enclosure thereof broken away to show the inner portions thereof.
Figure 3A:
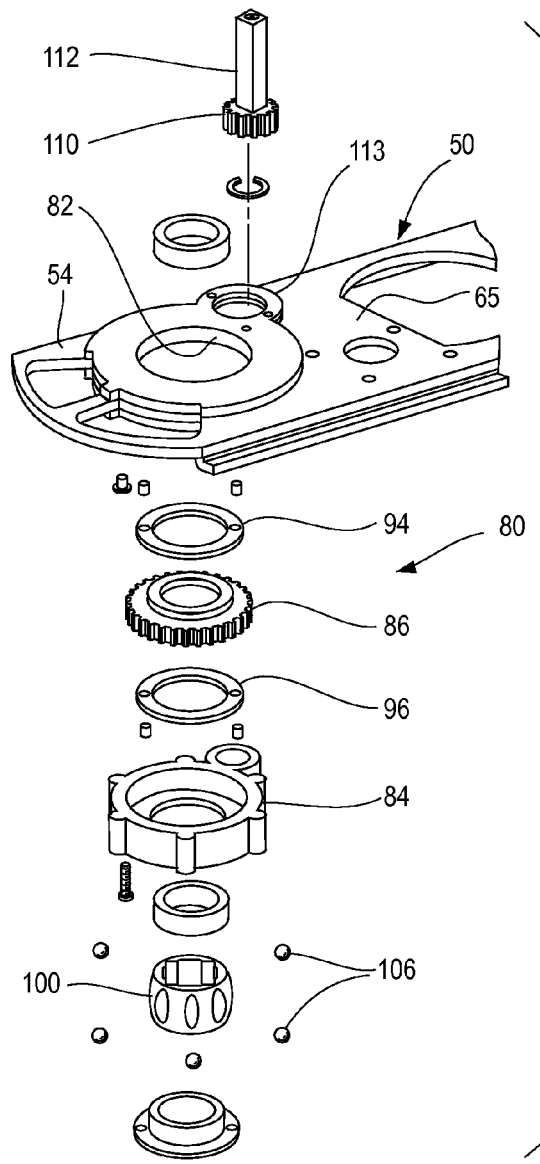
FIG. 3A is an exploded view showing the gearings within the torque multiplier head at the distal end of the second arm as shown in FIGS. 2 and 3.
Figure 5:
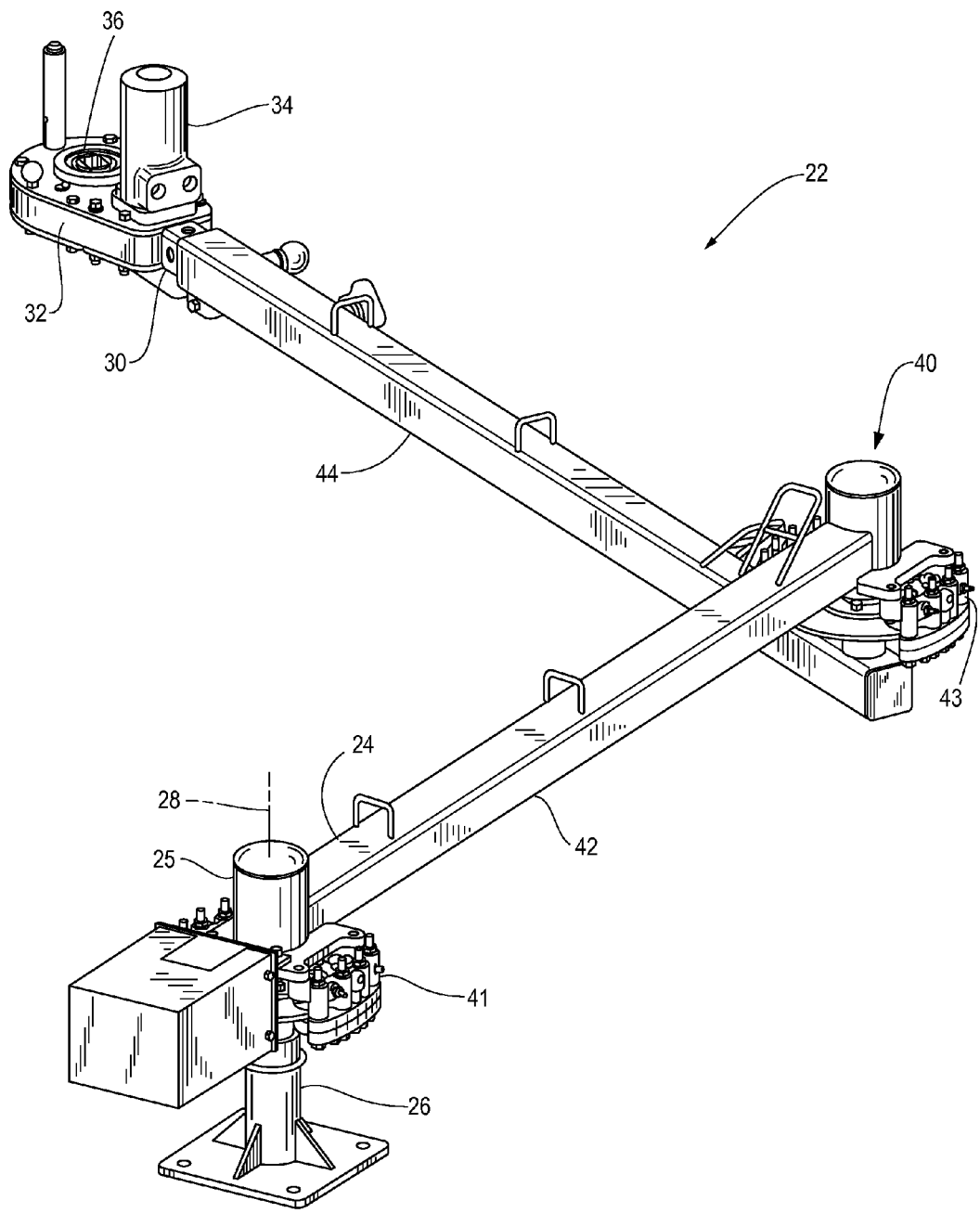
FIG. 5 is an isometric view of the first arm showing a valve turning machine at the distal end thereof.
Figure 6:
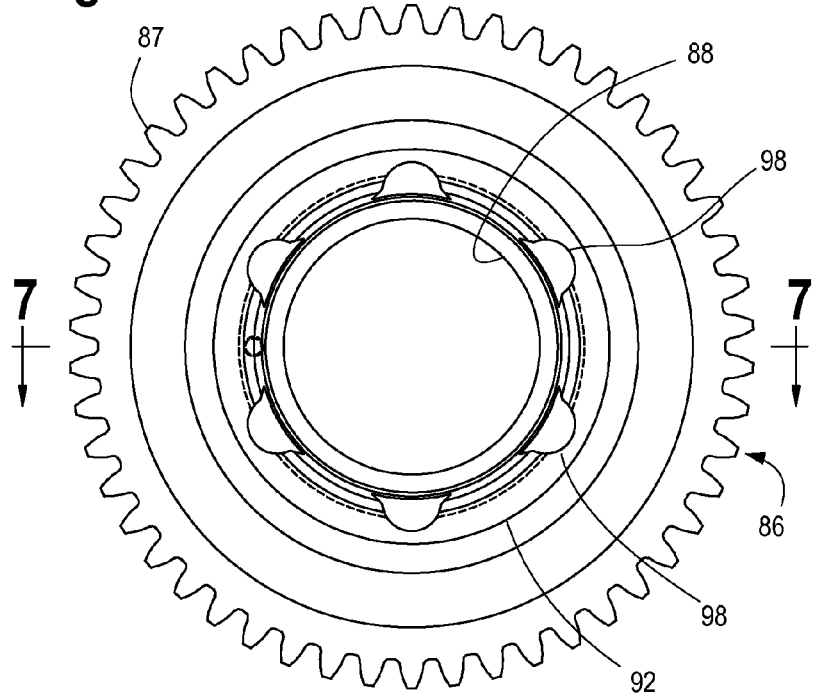
FIG. 6 is a front elevational view of the bull gear for the torque multiplier in the second arm.
Figure 7:
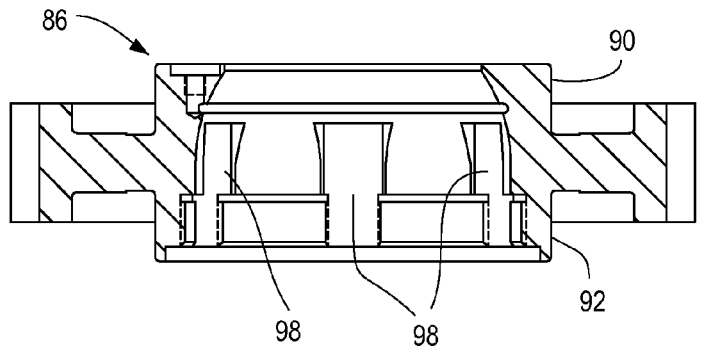
FIG. 7 is a cross-sectional view of the gear shown in FIG. 6.
Figure 8:
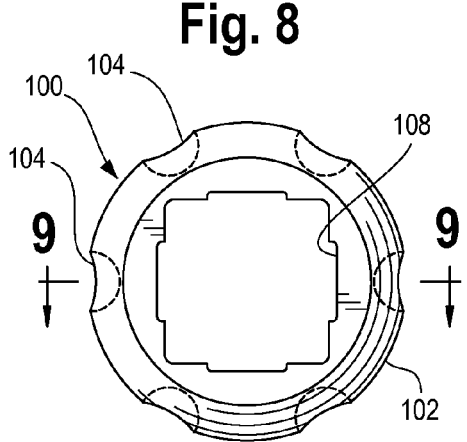
FIG. 8 is a top elevational view of a pivoting knuckle in the central opening of the second arm.
Figure 9:
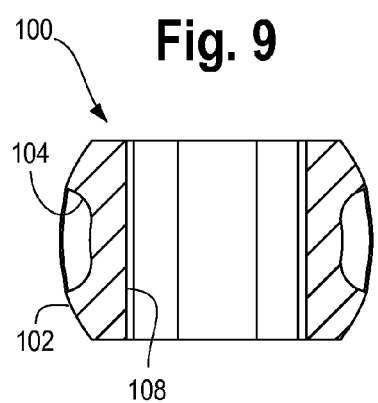
FIG. 9 is a cross-sectional view of the knuckle shown in FIG. 8 taken through lines 9-9 thereof.
Figure 10:
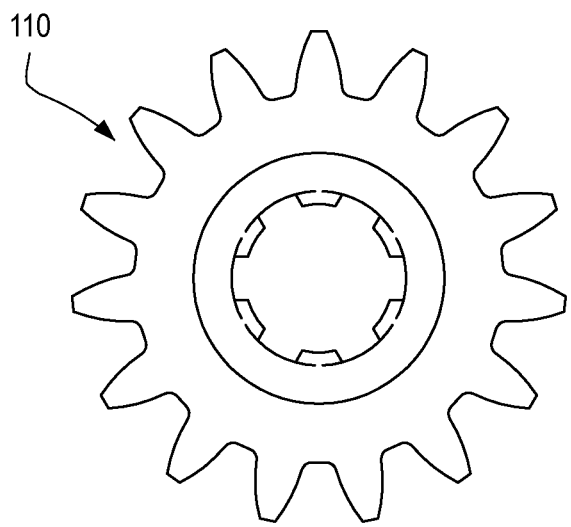
FIG. 10 is a top elevational view of the pinion that engages the bull gear to provide the torque multiplying in the second arm.

Referring to FIGS. 1, 2, and 5, to rotate the stem 14, a device 18 mounted on a vehicle 20 is provided. The device includes an arm 22 having a first end 24 rotatably mounted on a pivot 25 located at the upper end of a pedestal 26. The pivot 25 rotates about a vertical axis 28 such that the first end 24 of the arm 22 moves through a plane parallel to the underlying ground level 12. The arm 22 also has a second end 30 to which is attached a valve turning machine 32. The valve turning machine 32 is preferably rigidly attached to the second end 30, as shown, but could be adjustable about a horizontal axis if the outer end 30 of the arm 22 is vertically adjustable. The valve turning machine 22 has a motor 34 that rotates a drive member 36 having a transverse non-circular aperture therein into which the elongate key 17 is receivable. Rotation of the drive member 36 of the valve turning machine 32 causes rotation of the key 17 and rotation of the stem 14 for opening or closing the valve 10.

In the preferred embodiment, the arm 22 is manufactured in accordance with U.S. Pat. No. 8,025,078 B2 and does not extend continuously from the first end 24 to the second end 30, but instead has a centrally located second pivot 40 dividing the arm 22 into a first portion 42 that extends from the first end 24 to the second pivot 40, and a second portion 44 that extends from the second pivot 40 to the valve turning machine 32. The second pivot 40 allows rotation around a vertical axis retained at the distal end of the first portion 42 such that the valve turning machine 32 at the distal end of the second arm portion 44 moves through a plane parallel to the underlying ground 12. Also in accordance with U.S. Pat. No. 8,025,078 B2, hydraulic brakes 41, 43 are provided at the first pivot 28 and the second pivot 40 such that when the brakes are locked, the arm 22 will retain the valve turning machine 32 at a fixed location above the shaft 16, and when the brakes 41, 43 are unlocked the valve turning machine 32 can be moved to a position over a valve, or returned to a storage position with the valve turning machine retained against the vehicle 20.

It should be appreciated that the vast majority of valves in a municipal water system are relative small in size and are operable by a valve turning machine 32 mounted at the end of a relatively long arm 22 without requiring that the valve turning machine 32 or the supporting arm 22 be extremely heavy. However, there are some valves in a municipal water system that require a substantially greater amount of torque than is provided by existing valve turning machines mounted on maneuverable arms of the type disclosed in U.S. Pat. No. 8,025,078 B2.

Figure 4:
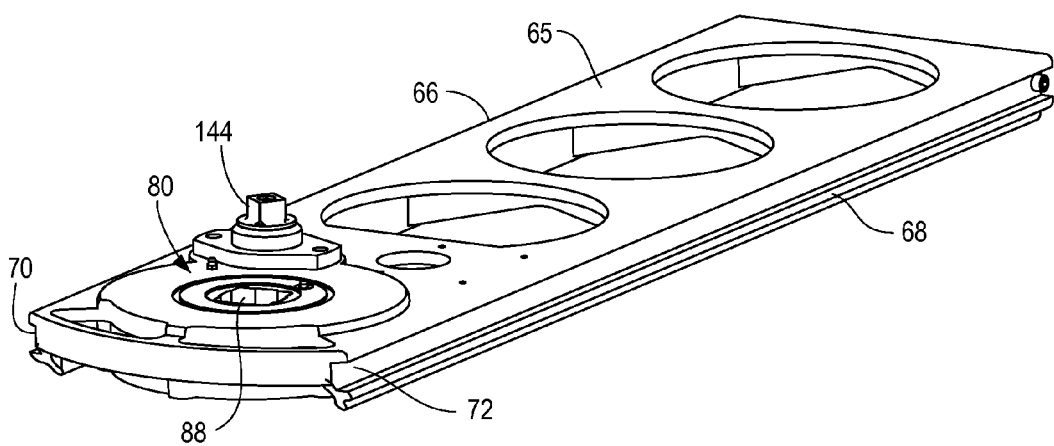
FIG. 4 is an isometric view of the slideable portion of the second arm.

Referring to FIGS. 1 through 5, to rotate the stem 14 of a very large valve 10, the vehicle 20 is provided with a second arm 50. The second arm 50 is rotatably mounted on the vehicle 20 for rotation around a pin 51 that defines a vertical axis 52 such that the outer end 54 of the arm 50 moves through a plane parallel to the underlying ground 12. In the preferred embodiment, the second arm 50 is longitudinally extendable. This is achieved by providing a rectangular retaining housing 56 on the vehicle with the housing 56 being pivotally mounted on the pivot pin 51 into which the arm 50 is longitudinally slideable. The housing 56 has a rectangular cross-section with parallel sides 60, 62, and extending along each of the parallel sides 60, 62 and within the interior of the housing 56 are parallel glide bars, one of which 63 is visible in FIG. 3. As best shown in FIG. 4, the second arm 50 is generally rectangular in shape with parallel sides 66, 68, and a planar upper surface 65 extending between the parallel sides 66, 68. Along each of the parallel sides 66, 68 and parallel to the upper surface 65 in a U-shaped track 70, 72 respectively for slideably receiving one of the glide bars 63 thereby enabling the second arm 50 to be longitudinally moveable within the housing 56. In the embodiment depicted, the lower surface of the housing 56 extends rearward of the housing and forms a tongue 69 with a transverse hole 71 in the outer end. As the housing 56 is rotated about the pivot pin 51, the tongue 69 moves across a planar deck 76 on the vehicle 20. A slot 78 in the deck 76 receives a bolt, also not visible, that extends from below the deck 76 through the slot 78, through the hole 71 in the tongue 69 and into a nut in the lower end of the a locking knob 79 to retain the bolt in the slot 78. When the knob 79 is loosened, the bolt is slideable within the slot 78 and the housing 56 is angularly adjustable through an arc permitted by the slot 78. When the knob 79 is tightened, the arm 50 is only moveable in a longitudinal direction along parallel glide bars 63. An adjustable screw 77 on the distal end of the second arm 50 can also be tightened against the surface 69 of the housing 56 to lock the second arm 50 against longitudinal movement with respect to the housing 56.

Referring to FIGS. 3A through 11, at the outer end 54 of arm 50 is a torque multiplying device 80 in accordance with the present invention. The torque multiplier 80 projects through a central aperture 82 that extends transversely through the planar upper surface 65 of the second arm 50. A housing 84 positioned below the surface 65 has a tubular body that extends around the lower surface of the aperture 82. Within the housing 84 is an annular bull gear 86 having a central opening 88, and extending around the central opening 88 of the bull gear 86 are upper and lower cylindrical shoulders 90, 92. The shoulders 90, 92 receive the inner races of bearings 94, 96, the outer races of which fit within the housing 84 and rotatably retain the bull gear 86 with the central opening 88 aligned with the central opening 82 in the second arm 50. The inner surface defining the opening 88 in the bull gear 86 includes a plurality of transverse spaced apart arcuate grooves 98-98. Fitted within the central opening 88 is a adjustable knuckle 100, the outer surface 102 of which defines a sphere sized to fit within the central opening 88 of the bull gear 86. Grooves 104-104 in the outer surface 102 of the knuckle 100 are complementary to the grooves 98-98 in the bull gear 86, and each complementary pair of aligned grooves 98, 104 receives a ball bearing 106-106. The knuckle 100 is therefore angularly adjustable within the bull gear 86. The knuckle 100 further includes a transverse bore 108 that is non-circular in size and shaped to slideably and non-rotatably receive the shaft of the non-circular key 17.

The teeth 87 of the bull gear 86 are engaged by the teeth of a pinion 110 mounted on a drive shaft 112, the upper end of which extends through a second aperture 113 in the upper surface of the second arm 50. The portion 114 of the drive shaft 112 that extends through the aperture is non-circular in shape and preferably rectangular in cross-section as depicted.

Figure 12:
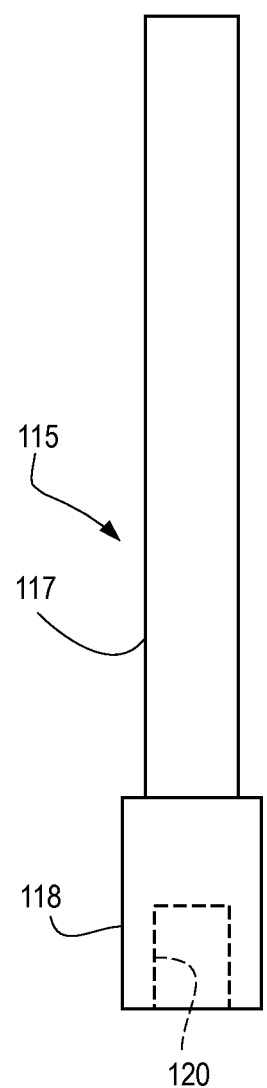
FIG. 12 is a side elevational view of an adapter key for drivingly attaching the valve operating machine shown in FIG. 5 to the torque multiplier shown in FIG. 3A.
Figure 11:
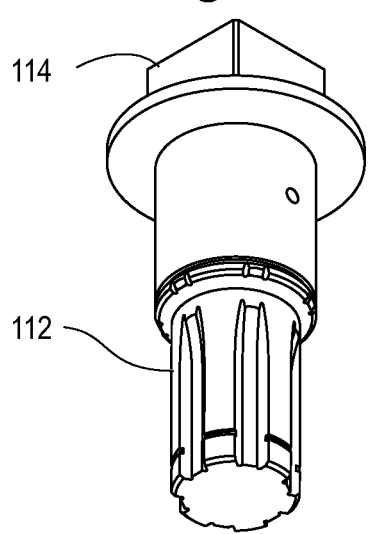
FIG. 11 is an isometric view of the drive shaft rotating the pinion shown in FIG. 10.

Referring to FIG. 12, the invention further includes an adapter key 115 having an elongate body 117 with a cross-section that is identical to the cross-section of the key 17 such that the elongate adapter key 115 is receivable in the central opening of the drive member 36 of the valve turning machine 32. At the lower end of the adapter key 115 and rigidly affixed thereto is a tubular connector 118 having an axially aligned non-cylindrical aperture 120 that extends into the lower end thereof. The aperture 120 has a cross-sectional shape that is a little larger than the cross-sectional shape of the upper end 114 of the drive shaft 112 such that the connector 116 can slideably, but non-rotatably, receive the upper end 114 of the drive shaft 112 of the torque multiplier 80.

Referring to FIGS. 1 and 2, the valve turning device 18 can be used to turn the stem 14 of a below-ground large valve 10. To turn the stem 14 of the valve 10 the vehicle is positioned near the shaft 16 and the second arm 50 is adjusted by rotating the rectangular housing 56 with respect to the vehicle 20 and sliding the second arm 50 with respect to the housing 56 until the central opening 88 of the bull gear 86 is generally positioned over the shaft 16. The second arm is then locked in place over the shaft 16 by tightening the knob 79 and screw 77. The key 17 is then positioned within the central opening 108 of the knuckle 100 with the lower end thereof fitted around the stem 14 of the valve. Thereafter, the first arm 22 is adjusted, using the first and second pivots 28, 40 until the central opening of the drive member 36 is positioned above the upper end 114 of the drive shaft 112. The adapter key 115 is then positioned in the drive member 36 with the lower end thereof fitted around the upper end 114 of the drive shaft 12. Thereafter, the valve turning machine 32 can be operated to rotate the adapter key 115. Rotation of the adapter key 115 causes the pinion 110 to rotate the bull gear 86 and the key 17 which in turn rotates the valve stem 14. The adjustable knuckle 100 will accommodate any minor misalignment of the device 18 over the valve 10.

In the preferred embodiment, the ratio of teeth between the bull gear 86 and the pinion 110 is about 3.33 to 1. Accordingly, the torque multiplier 80 in the second arm 50 will apply a torque to the key 17 that is approximately 3.33 times the torque applied by the valve turning machine 32 to the pinion drive shaft 112, thereby permitting the device 18 to exercise a large valve 10 of a municipal water system.

While the present invention has been described with respect to a single embodiment, it will be appreciated that many modifications and variations may be made without departing from the spirit and scope of the invention. It is therefore the intent of the appended claims to cover all such modifications and variations that fall within the spirit and scope of the invention.

What is claimed:

1. A device for turning the stem of a valve comprising
   a vehicle,
   a first arm rotatably mounted on said vehicle,
   said first arm having an inner end rotatably mounted on said vehicle and an outer end movable relative to said inner end laterally beyond said vehicle,
   a valve turning machine at said outer end of said first arm,
   said valve turning machine including an output drive for turning said valve stem,
   a second arm movably mounted on said vehicle,
   said second arm having an outer end movable relative to said vehicle,
   a multiplier head at said outer end of said second arm,
   said multiplier head having an input attachable to said output drive, and
   said multiplier head also having an output drive for turning said valve stem.

2. The device of claim 1 wherein said multiplier head includes a gearing for increasing a torque from said input drive of said multiplier head to said output drive thereof.

3. The device of claim 1 and further comprising a connector for connecting said output drive of said valve turning machine to said input.

4. The device of claim 1, wherein said second arm is rotatably mounted on said vehicle.

5. The device of claim 1, wherein said second arm is longitudinally extendable.

6. The device of claim 1, wherein said outer end of said first arm and said outer end of said second arm extend laterally beyond said vehicle.

7. The device of claim 1 wherein said multiplier head includes a bull gear and a pinion.

8. The device of claim 7 wherein said bull gear has a central opening and said central opening is non-circular and shaped complementary to a cross-section of a key attachable to said stem.

9. The device of claim 8 and further comprising a connector for connecting said output drive of said valve turning machine to said input.

10. A device for turning the stem of a valve comprising
    a vehicle,
    an elongate key engageable with said valve stem,
    a first arm on said vehicle,
    said first arm having an inner end mounted on said vehicle,
    a first valve turning device on said first arm,
    said first valve turning device having a first output drive,
    a second arm on said vehicle,
    a second valve turning device on said second arm,
    said second valve turning device having a second output drive engageable with said elongate key for rotating said valve stem,
    a motor for operating said first valve turning device and said second valve turning device, and
    a connector for connecting said first output drive of said first valve turning device to said second valve turning device,
    wherein said first output drive is selectively engageable with said elongate key and said connector.

11. The device of claim 10, wherein said first output drive includes a non-circular aperture for selectively receiving said elongate key and said connector, and wherein said second output drive includes a non-circular bore for receiving said elongate key.

12. The device of claim 10 wherein said second valve turning device includes a torque multiplier head having an input drive and the second output drive.

13. The device of claim 12 wherein said motor is on said first valve turning device.

14. The device of claim 13 wherein said multiplier head includes a gearing for increasing a torque from an impact drive of said multiplier head to an output thereof.

15. The device of claim 14 wherein said multiplier head includes a bull gear and a pinion.

16. The device of claim 15 wherein said bull gear has a central opening and said central opening is non-circular and shaped complementary to a cross-section of a key attachable to said stem.

* * * * *